United States Patent
Yen et al.

(10) Patent No.: US 9,565,709 B2
(45) Date of Patent: Feb. 7, 2017

(54) WIRELESS COMMUNICATION DEVICE AND METHOD CAPABLE OF PEER-TO-PEER INTERCONNECTION

(71) Applicant: REALTEK SEMICONDUCTOR CORPORATION, Hsinchu (TW)

(72) Inventors: Kuang-Yu Yen, Taichung (TW); Yu-Chen Liu, Taipei (TW)

(73) Assignee: Realtek Semiconductor Corporation, Hsinchu (TW)

( * ) Notice: Subject to any disclaimer, the term of this patent is extended or adjusted under 35 U.S.C. 154(b) by 132 days.

(21) Appl. No.: 14/602,691

(22) Filed: Jan. 22, 2015

(65) Prior Publication Data
US 2015/0208455 A1    Jul. 23, 2015

(30) Foreign Application Priority Data

Jan. 23, 2014 (TW) ............................... 103102425 A
Jun. 13, 2014 (TW) ............................... 103120631 A

(51) Int. Cl.
*H04W 76/02* (2009.01)
*H04W 4/08* (2009.01)
(Continued)

(52) U.S. Cl.
CPC ............. *H04W 76/023* (2013.01); *H04W 4/08* (2013.01); *H04W 84/20* (2013.01); *H04W 84/12* (2013.01)

(58) Field of Classification Search
None
See application file for complete search history.

(56) References Cited

U.S. PATENT DOCUMENTS 9,301,127 B2 *   3/2016  McCann ............... H04W 8/186
2011/0225305 A1 * 9/2011  Vedantham ........... G06F 1/3203
                                              709/227

(Continued)

OTHER PUBLICATIONS

Office Action of the counterpart Taiwan application 103120631 dated Aug. 20, 2015.

(Continued)

*Primary Examiner* — Hong Cho
(74) *Attorney, Agent, or Firm* — WPAT, P.C., Intellectual Property Attorneys; Anthony King

(57) ABSTRACT

The present invention discloses a wireless communication device capable of establishing peer-to-peer connection passively or actively. The device conforms to an IEEE 802.11 standard, and comprises: a control block, a transmission circuit and a reception circuit. When the device intends to passively establish peer-to-peer connection, said control block generates a local-end peer-to-peer connection message which includes a local-end group owner intent but isn't generated in response to any known/detected device; said transmission circuit broadcasts a local-end peer-to-peer connection packet according to the message; and said reception circuit receives a connection-end peer-to-peer connection request from a connection-end for the first time after broadcasting the message, wherein the request includes a connection-end group owner decision related to the local-end group owner intent. Accordingly, after receiving the request, the wireless communication device functions as a master or a slave according to the decision, and then establishes the peer-to-peer connection with the first connection-end.

20 Claims, 3 Drawing Sheets

(51) Int. Cl.
*H04W 84/20* (2009.01)
*H04W 84/12* (2009.01)

(56) References Cited

U.S. PATENT DOCUMENTS

| | | |
|---|---|---|
| 2012/0224569 A1 | 9/2012 | Kubota |
| 2013/0252656 A1 | 9/2013 | Lee et al. |
| 2014/0019513 A1* | 1/2014 | Han .................. H04L 29/08531 709/202 |
| 2014/0092885 A1* | 4/2014 | Venkatachalam ... H04W 76/023 370/338 |
| 2015/0245393 A1* | 8/2015 | Lee ....................... H04W 8/005 370/338 |
| 2015/0282229 A1* | 10/2015 | Vedula ................ H04W 76/023 370/338 |

OTHER PUBLICATIONS

English abstract translation of the Office Action of the counterpart Taiwan application 103120631 dated Aug. 20, 2015.
Search Report of the counterpart Taiwan application 103120631 dated Aug. 20, 2015.
Yifeng Yang "Microchip MiWi P2P Wireless Protocol", Microchip Technology Inc., 2008.

\* cited by examiner

WIRELESS COMMUNICATION DEVICE AND METHOD CAPABLE OF PEER-TO-PEER INTERCONNECTION

BACKGROUND OF THE INVENTION

1. Field of the Invention

The present disclosure relates to a wireless communication device and method, especially to a wireless communication device and method capable of establishing peer-to-peer connections.

2. Description of Related Art

Wi-Fi Direct is a peer-to-peer connection technology developed and authenticated by Wi-Fi Alliance. This technology allows two wireless communication devices to connect with each other without any intermediate devices (e.g., a wireless network access point, a router, a hub, etc.). The current Wi-Fi Direct protocol is established under the regulation of an IEEE 802.11 standard and sets up steps for the peer-to-peer connection establishment between non-intermediate devices. The said steps include a Device Discovery Procedure capable of allowing wireless communication devices to discover each other, a Group Owner Negotiation (GO Negotiation) of a Group Formation Procedure capable of setting each of the wireless communication devices to be a master or a slave and a Provisioning step of the Group Formation Procedure capable of allowing the wireless communication devices to exchange their pairing rules. These procedures result in the interconnection process of Wi-Fi Direct being more complicated, failing more often and increasing the connection-establishment time. As a result, users often find Wi-Fi Direct unfriendly in usage.

In detail, the Device Discovery Procedure in Wi-Fi Direct protocol includes a Listen State, a Scan State and a Find Phase. The Listen State allows a wireless communication device to enter a state of being discoverable. For instance, in a case that the communication frequency band is located at 2.4 GHz, the Wi-Fi Direct Protocol defines the wireless channels 1, 6, 11 in this frequency band as social channels. A wireless communication device is obligated to choose one of the three channels as the social channel for itself and to periodically jump to the social channel from a current channel in the Listen State so as to wait for the call and query from other wireless communication devices. The wireless communication device can also visit every channel in the frequency band during the Scan State so as to find out whether a linkable wireless communication device exists, and the search means may not only include a general scan procedure in compliance with a 802.11 standard but also a procedure for searching devices in support of the Wi-Fi Direct Protocol. The wireless communication device is further able to go to the social channel in the Find Phase to find out other wireless communication devices for pairing. Accordingly, once a wireless communication device enters the Device Discovery Procedure, the wireless communication device switches between the above-mentioned three states. This series of actions is iterative and complicated and probably makes two wireless communication devices unable to discover each other due to their frequency jumps (or called frequency hopping). Even though two wireless communication devices are paired successfully, the frequency jumps from the start of the Device Discovery Procedure to the beginning of peer-to-peer connection could make the connection between the two devices unstable or consume too much time in the establishment of the previous or new connection.

In addition, as to the GO Negotiation of the Group Formation Procedure, the Wi-Fi Direct Protocol sets a rule to determine the master-slave relationship between link partners through an exchange of three packets. The three packets are GO Negotiation Request, GO Negotiation Response and GO Negotiation Confirmation respectively. More specifically, the wireless communication device informs its link object of its intention of being a group owner (i.e. the master in a link relationship) through a packet carrying a GO intent, and the device who has a stronger intention becomes the group owner. If the intentions of the two link objects are the same, a Tie Breaker rule is executed to make arbitration. But if both the two link objects claim their GO intent with the highest value, which means that none of the two sides compromises, the negotiation breaks down, and the connection is not established. The above-mentioned negotiation process needs the exchange of three packets so as to determine the master-slave relationship Due to the poor environment of the wireless transmission, the above-mentioned negotiation process probably consumes a lot of time or fails to connect when some transmission is lost or retransmitted during the packet exchange process. Moreover, if both the two link objects claim the highest GO intent, this negotiation process is unable to prevent the negotiation from breaking down, which leads to a connection failure.

People who are interested in the detail of Wi-Fi Direct may refer to the standard of Wi-Fi Alliance.

SUMMARY OF THE INVENTION

In view of the problems of the prior art, an object of the present disclosure is to provide a wireless communication device and method capable of establishing peer-to-peer connection for the improvement over the prior art.

Another object of the present disclosure is to simplify the process of establishing the peer-to-peer connection for wireless communication devices and to prevent the connection failure caused by an uncompromising negotiation.

The present disclosure discloses a wireless communication device capable of passively establishing peer-to-peer connection under the regulation of an IEEE 802.11 standard. An embodiment of the wireless communication device includes a control block, a transmission circuit and a reception circuit. Said control block is operable to generate a local-end peer-to-peer connection message without referring to any information from a first connection-end, in which the local-end peer-to-peer connection message includes a local-end group owner intent; said transmission circuit is operable to broadcast a local-end peer-to-peer connection packet according to the local-end peer-to-peer connection message; and said reception circuit is operable to receive a first connection-end peer-to-peer connection request from the first connection-end for the first time after the broadcasting of the local-end peer-to-peer connection packet, in which the first connection-end peer-to-peer connection request includes a first connection-end group owner decision in relation to the local-end group owner intent. Therefore, the wireless communication device is operable to function as a master or a slave in relation to the first connection-end according to the first connection-end group owner decision, and to establish peer-to-peer connection with the first connection-end.

The present disclosure further discloses a wireless communication device capable of actively establishing peer-to-peer connection under the regulation of an IEEE 802.11 standard. An embodiment of the wireless communication device comprises: a reception circuit; a control block; and a transmission circuit. Said reception circuit is operable to receive a second connection-end peer-to-peer connection packet from a second connection-end in which the second connection-end peer-to-peer connection packet includes no information exclusively pertaining to the wireless communication device; said control block is operable to set the wireless communication device to be a master or a slave in relation to the second connection-end according to a second connection-end group owner intent included in the second connection-end peer-to-peer connection packet, and thereby generate a local-end peer-to-peer connection request message; and said transmission circuit is operable to send a local-end peer-to-peer connection request to the second connection-end according to the local-end peer-to-peer connection request message. Accordingly, the wireless communication device is operable to establish peer-to-peer connection with the second connection-end.

The present disclosure also discloses a wireless communication method carried out by the wireless communication device of the present disclosure or its equivalent. An embodiment of the wireless communication method comprises: a passive connection-establishment step for establishing peer-to-peer connection passively; and/or an active connection-establishment step for establishing peer-to-peer connection actively. Said passive connection-establishment step includes the following subsidiary steps: broadcasting a local-end peer-to-peer connection packet which is generated without referring to any information of a first connection-end; receiving a first connection-end peer-to-peer connection request from the first connection-end, in which the first connection-end peer-to-peer connection request is related to the local-end peer-to-peer connection packet; setting the wireless communication device to be a master or a slave in relation to the first connection-end according to the first connection-end peer-to-peer connection request; and establishing peer-to-peer connection with the first connection-end. On the other hand, said active connection-establishment step includes the following subsidiary steps: receiving a second connection-end peer-to-peer connection packet from a second connection-end, in which the second connection-end peer-to-peer connection packet includes no information exclusively pertaining to the wireless communication device; setting the wireless communication device to be the master or the slave in relation to the second connection-end according to the second connection-end peer-to-peer connection packet; and establishing peer-to-peer connection with the second connection-end.

These and other objectives of the present disclosure no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
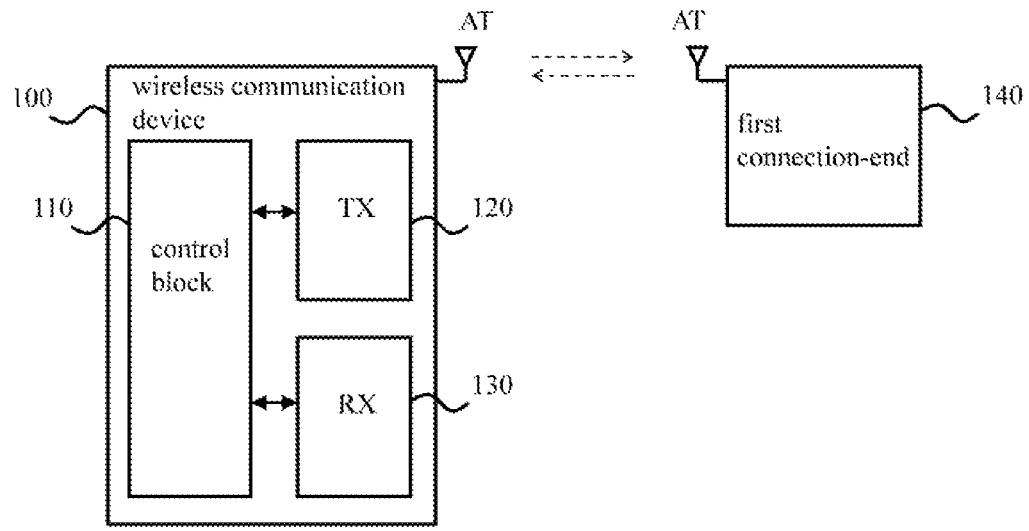
FIG. 1 illustrates an embodiment of the wireless communication device of the present disclosure operable to passively establish peer-to-peer connection.

The following description is written by referring to terms of this technical field. If any term is defined in this specification, such term should be explained accordingly. In addition, the connection between objects or events in the disclosed embodiments can be direct or indirect provided that these embodiments are still practicable under such connection. Said "indirect" means that an intermediate object or a physical space exists between the objects, or an intermediate event or a time interval exists between the events.

The present disclosure includes a wireless communication device and method capable of establishing peer-to-peer connection. Said device and method comply with an IEEE 802.11 standard (e.g., at least one of the IEEE 802.11a, 802.11g, 802.11n, 802.11ac standards and the likes) and are capable of simplifying and accelerating the peer-to-peer connection process for wireless communication devices and capable of preventing the connection failure due to an uncompromising negotiation in determining a master-slave relationship. The present disclosure is applicable to an integrated circuit (e.g., a wireless communication integrated circuit) or an end product (e.g., an electronic product capable of wireless communication), and the present disclosure could be carried out with components or steps equivalent to those described in this specification by those of ordinary skill in the art as long as the consequent implementation is practicable. In addition, some element itself of the wireless communication device could be known, and thus the detail of such element is omitted provided that this omission nowhere dissatisfies the disclosure and enablement requirements. Similarly, since the wireless communication method can be in the form of software and/or firmware and carried out by the wireless communication device of the present disclosure or its equivalent, the following description abridges the hardware details for executing the method but puts the emphasis on the steps. Furthermore, each embodiment in the following description includes one or more features, but this doesn't mean that one carrying out the present disclosure should make use of all the features of one embodiment at the same time or only carry out different embodiments separately. In other words, if an implementation derived from one or more of the embodiments is practicable, a person of ordinary skill in the art can selectively make use of some or all of the features in one embodiment or selectively make use of the combination of some or all features in several embodiments to have the implementation come true.

In order to simplify connection procedure and avoid negotiation failure, a to-be-connected end broadcast a peer-to-peer connection packet without specifying any destination or a peer-to-peer connection packet specifying a non-specific destination, and a connecting end determines itself to be a master or a slave according to the peer-to-peer connection packet after receiving this packet and sends a request to the to-be-connected end afterward. If the connecting end receives several peer-to-peer connection packets broadcasted by different to-be-connected ends, the connecting end chooses one among the to-be-connected ends for peer-to-peer connection establishment according to the transmission distance estimations, priority rankings or transmission rates of these peer-to-peer connection packets. But if all the to-be-connected ends fail to satisfy a prescribed condition, the connecting end may establish no peer-to-peer connection. Said to-be-connected end herein is a wireless device incapable of actively deciding to establish peer-to-peer connection under its role of connection, while the connecting end here is a wireless device capable of actively deciding to establish peer-to-peer connection. Both the to-be-connected end and the connecting end in the present disclosure are wireless communication devices conforming to an IEEE 802.11 standard, and each of them may be a notebook computer, a handheld mobile device (e.g., a cell phone, a tablet computer, etc.), a stationary communication device (e.g., a desktop computer, a network television, etc.) or the wireless communication circuit of any of the above-mentioned devices.

FIG. 1 illustrates an embodiment of the wireless communication device of the present disclosure playing the role of a to-be-connected end. As it is shown in FIG. 1, the wireless communication device 100 comprises: a control block 110; a transmission circuit (TX) 120; and a reception circuit (RX) 130. Said control block 110 is operable to generate a local-end peer-to-peer connection message under a passive connection-establishment setting, in which the local-end peer-to-peer connection message is generated without referring to any information (e.g., a peer-to-peer connection request or the related information thereof) exclusively pertaining a known/detected object, thus implying that the message is not generated in response to the information transmitted from the known/detected object. In addition, the content of the message includes a local-end group owner intent which could be a value (e.g., a value between 0 and 15), a code, or data recognizable for both of the connecting sides. Said transmission circuit 120 is operable to broadcast a local-end peer-to-peer connection packet according to the local-end peer-to-peer connection message through an antenna AT under the passive connection-establishment setting. The local-end peer-to-peer connection packet includes the local-end group owner intent while the broadcasting aims at no specific destination (e.g., the first connection-end 140 in the following description) or aims at a non-specific destination, which implies that the broadcasted packet is not addressed to some designated device. Said reception circuit 130 is operable to receive a first connection-end peer-to-peer connection request from a first connection-end 140 through the antenna AT for the first time after the broadcasting of the local-end peer-to-peer connection packet, in which the first connection-end peer-to-peer connection request includes a first connection-end group owner decision which is a value, a code, or data recognizable for both of the connecting sides and capable of notifying the local-end (i.e. the wireless communication device 100) whether the local-end is supposed to act as a master or a slave. More specifically, the first connection-end group owner decision is related to the aforementioned local-end group owner intent, which means that the local-end group owner intent (e.g., the high or low intention of becoming a group owner, the tie breaker manner, etc.) affects the content of the first connection-end group owner decision. The wireless communication device 100 acts as a master or a slave in relation to the first connection-end 140 and then establishes peer-to-peer connection with the first connection-end 140. In a general case, the master is allowed to decide the frequency channel for the peer-to-peer connection, and thus it can keep its established connection (e.g., a connection with a wireless access point) and carry out the peer-to-peer connection without frequency jump. On the other hand, the slave may need to keep its established connection and execute the peer-to-peer connection through frequency jump. In another case, the master may decide to establish peer-to-peer connection through frequency jump.

In light of the above, during the process of establishing peer-to-peer connection, the wireless communication device 100 is not obligated to do frequency hopping, which means that it has no need to visit the social channels specified by Wi-Fi Direct Protocol so as to broadcast the local-end peer-to-peer connection packet and to receive the first connection-end peer-to-peer connection request. However, the wireless communication device 100 may choose one among all available frequency channels (which may include or exclude the social channels of Wi-Fi Direct Protocol) to broadcast the local-end peer-to-peer connection packet and receive the first connection-end peer-to-peer connection request. For instance, if the wireless communication device 100 has communicated with some wireless communication device (e.g., a wireless access point (AP)) through a wireless transmission channel of a first frequency, the transmission circuit 120 broadcasts the local-end peer-to-peer connection packet through the channel of the first frequency. After the first connection-end receives the local-end peer-to-peer connection packet and responds to it through the same channel, the reception circuit 130 receives the first connection-end peer-to-peer connection request from the first connection-end through the channel of the first frequency. Afterwards, if the wireless communication device 100 acts as a master according to the request, the wireless communication device 100 establishes peer-to-peer connection with the first connection-end 140 through the channel of the first frequency or any available channel. But if the wireless communication device 100 acts as a slave in accordance with the request, it establishes peer-to-peer connection with the first connection-end 140 through the channel (e.g., the channel of the first frequency or the channel of another frequency) designated by the first connection-end.

Figure 2:
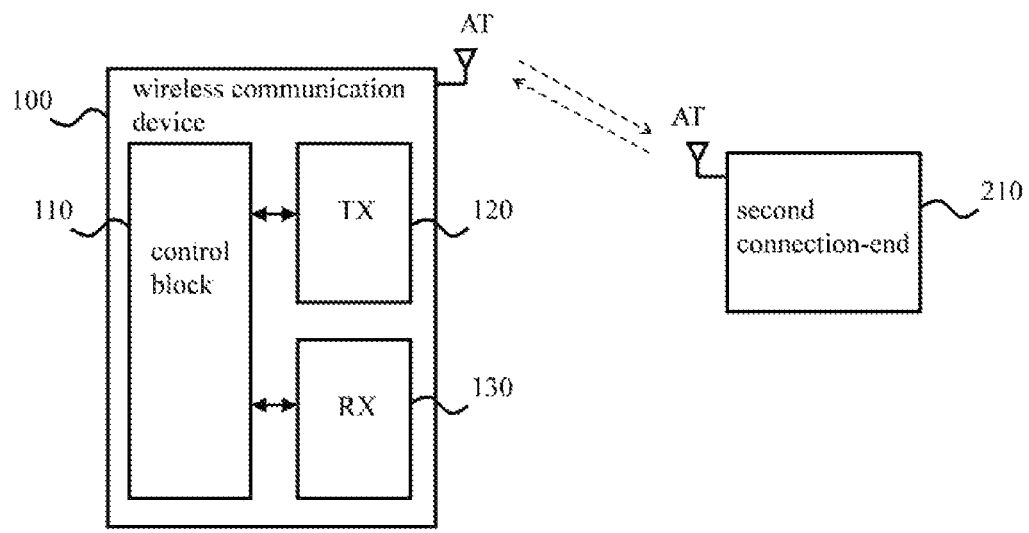
FIG. 2 illustrates an embodiment of the wireless communication device of the present disclosure operable to actively establish peer-to-peer connection.

The wireless communication device 100 can not only act as a to-be-connected end but also a connecting end such that the wireless communication device 100 can actively visit each frequency channel to receive the peer-to-peer connection packet broadcasted by other wireless communication devices. For instance, as it is shown in FIG. 2, the reception circuit 130 is able to receive a second connection-end peer-to-peer connection packet from a second connection-end 210 under an active connection-establishment setting while the second connection-end peer-to-peer connection packet is not addressed to the wireless communication device 100 exclusively, which means that the packet includes none of the dedicated information (e.g., the internet protocol (IP) address, the media access control (MAC) address, the service set identifier (SSID), etc.) of the wireless communication device 100, or the packet is a broadcasting packet with no specific destination. In addition, under the active connection-establishment setting, the control block 110 is able to directly set the wireless communication device 100 to be a master or a slave in relation to the second connection-end 210 according to a second connection-end group owner intent (like the aforementioned value, code or data of the local-end group owner intent) included in the second connection-end peer-to-peer connection packet, and thereby generate a local-end peer-to-peer connection request message. In other words, the wireless communication device 100 here is able to determine the master-slave relationship without exchanging packets with the second connection-end 210. Furthermore, under the active connection-establishment setting, the transmission circuit 120 is able to send a local-end peer-to-peer connection request to the second connection-end 210 according to the local-end peer-to-peer connection request message. In brief, the wireless communication device 100 acting as a connecting end plays the role of the aforementioned first connection-end 140 while the second connection-end 210 plays the role of the fore-described wireless communication device 100 acting as a to-be-connected end.

It should be noted that the wireless communication device 100 may establish peer-to-peer connection with a plurality of wireless communication devices concurrently. In the meantime, the role of the wireless communication device 100 could act as a to-be-connected end or connecting end in all peer-to-peer connection cases or act as a to-be-connected end and a connecting end respectively in different cases. Moreover, all the channels for peer-to-peer connection could be the same wireless transmission channel or different wireless transmission channels. It should also be noted that when the wireless communication device 100 acts as a to-be-connected end and a connecting end respectively, the passive and active connection-establishment settings come from the software/hardware settings (including some or all of the following settings: parameters, instructions, program codes, hardware connection or logic relation, etc.) such that the wireless communication device 100 is able to practice the present disclosure. Briefly, people of ordinary skill in the art can determine these settings in accordance with the teaching and suggestion of the present disclosure and the software/hardware resources available to them.

Referring back to FIG. 2, the wireless communication device 100 acting as a connecting end is operable to decide whether a connection with the to-be-connected end should be established under the aforementioned active connection-establishment setting. For instance, under the active connection-establishment setting, the control block 110 is operable to determine whether it is appropriate for the wireless communication device 100 to establish peer-to-peer connection with the second connection-end 210 according to the transmission distance estimation derived from the second connection-end peer-to-peer connection packet. More specifically, if the transmission distance estimation indicates that the second connection-end among one or more to-be-connected ends is the closest to the wireless communication device 100 or conforming to a distance requirement (e.g., reaching a reference value), the wireless communication device 100 is allowed to establish peer-to-peer connection with the second connection-end. For another instance, under the active connection-establishment setting, the control block 110 may determine whether the wireless communication device 100 should establish peer-to-peer connection with the second connection-end 210 according to the priority ranking derived from the second connection-end peer-to-peer connection packet (i.e. the ranking of the second connection-end 210 among one or more to-be-connected ends, which may be the highest ranking or meet with the threshold of a preferential requirement). In addition, in the present embodiment, the control block 110 is operable to get the transmission distance estimation of the second connection-end peer-to-peer connection packet in accordance with the signal intensity of this packet. In an alternative embodiment, the control block 110 may accomplish the transmission distance estimation by referring to request time (e.g., a time interval between the transmission time point of the local-end peer-to-peer connection message and the reception time point of the second connection-end peer-to-peer connection packet), signal quality (e.g., an quality index such as a signal-to-noise ratio, a bit error rate, a retransmission number, etc.), and the like. Furthermore, in the present embodiment, the control block 110 is operable to compare the second connection-end group owner intent with another local-end group owner intent (which may be equal to or different from the aforementioned local-end group owner intent) of the wireless communication device 100 and thereby to set the wireless communication device 100 as a master or a slave. If the intentions of both connecting sides are equivalent, the control block 100 may decide the master-slave relationship with a prescribed arbitration rule such as a rule always making the connecting end or to-be-connected end be the master, or randomly making the connecting end or to-be-connected end be the master, or making decision in light of the current transmission requirement of the wireless communication device 100. Such modifications and the equivalent thereof are embraced by the scope of the present disclosure.

Figure 3:
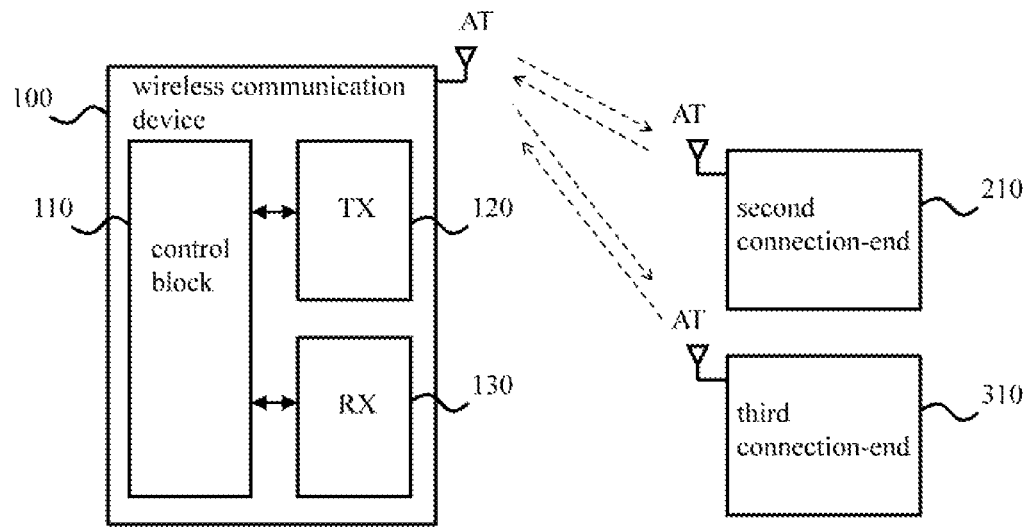
FIG. 3 illustrates an exemplary implementation based on the embodiment of FIG. 2.

Reference is made to FIG. 3. As a connecting end, the wireless communication device 100 may receive a plurality of peer-to-peer connection packets broadcasted by different to-be-connected ends concurrently and thereby need to pick one of them as the link partner. For instance, the reception circuit 130 receives not only the aforementioned second connection-end peer-to-peer connection packet but also a third connection-end peer-to-peer connection packet from a third connection-end 310. Meanwhile, under the active connection-establishment setting, the control block 110 refers to the transmission distance estimations, priority rankings or transmission rates of the second and third connection-end peer-to-peer connection packets so as to decide which of the second connection-end 210 and the third connection-end 310 the wireless communication device 100 establishes the peer-to-peer connection with. In detail, if the transmission distance estimation of the second connection-end peer-to-peer connection packet is better than the transmission distance estimation of the third connection-end peer-to-peer connection packet, if the priority ranking of the second connection-end peer-to-peer connection packet is higher than the priority ranking of the third connection-end peer-to-peer connection packet, or if the transmission rate indicated by the second connection-end peer-to-peer connection packet more conforms to the transmission rate of the wireless communication device 100 (which means that both the second connection-end 210 and the wireless communication device 100 are inclined to carry out connection at a transmission rate higher or lower than the transmission rate indicated by the third connection-end 310), the control block 110 decides that the wireless communication device 100 should establish peer-to-peer connection with the second connection-end 210. In addition, as it is described in the preceding paragraph, the control block 110 may obtain the transmission distance estimation of the second and third connection-end peer-to-peer connection packets according to the signal intensity, request time or signal quality of the two packets.

Reference is made back to FIG. 3, as a connecting end, the wireless communication device 100 may execute channel switching to find out a to-be-connected end. For example, the wireless communication device 100 keeps a connection through a wireless transmission channel of a first or a second frequency at first. Afterwards, in order to search an available to-be-connected end for peer-to-peer connection, the wireless communication device 100 stays with the wireless transmission channel of the first frequency or go to the wireless transmission channel of the second frequency so as to receive the aforementioned second connection-end peer-to-peer connection packet by the reception circuit 130. The communication device 100 then goes to a wireless transmission channel of a third frequency to receive the aforementioned third connection-end peer-to-peer connection packet by the reception circuit 130 so as to discover the to-be-connected ends (i.e. the second and third connection-ends). Thereafter, the connecting end (i.e. the wireless communication device 100 here) or the to-be-connected end who acts as a master decides the channel for the peer-to-peer connection.

It should be noted that the embodiments illustrated by FIG. 1 and FIG. 2 could be independent of each other or implemented as a whole, which means that the wireless communication device 100 may embody both the functions of a connecting end and a to-be-connected end of the present disclosure or merely embody one of them. In addition, the terms "active" and "passive" in this specification imply that the decision of peer-to-peer connection establishment is held by the device itself and another device respectively. Furthermore, in consideration of that some connection-ends may not be capable of implementing the techniques of the present invention or may disable the techniques, the wireless communication device 100, no matter what kind of roles (i.e. the connecting and to-be-connected ends) it plays, uses the existing Wi-Fi Direct technique instead or uses the present disclosure and the existing technique alternatively for connection establishment when the wireless communication device 100 is unable to establish peer-to-peer connection through the present disclosure.

Figure 4:
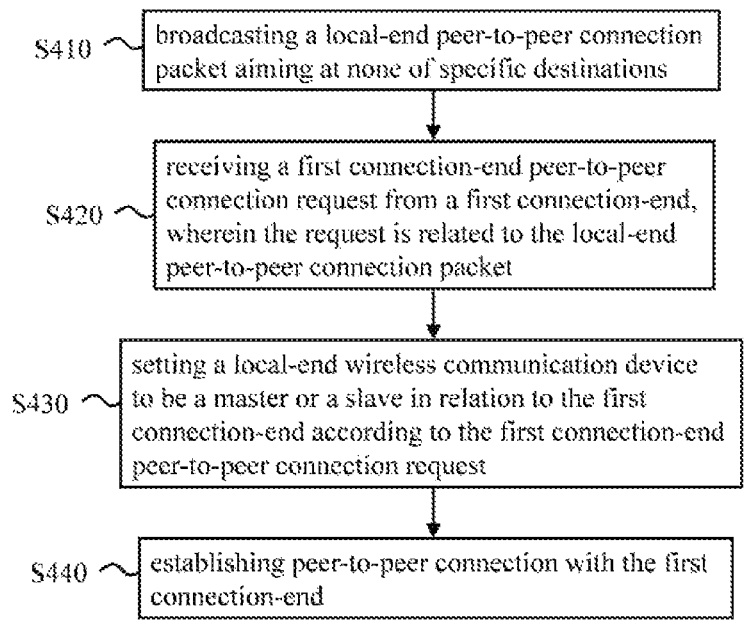
FIG. 4 illustrates an embodiment of the passive connection-establishment step of the wireless communication method of the present disclosure.

In addition to the above-disclosed device, the present disclosure also discloses a wireless communication method capable of peer-to-peer connection, in which the wireless communication method can be carried out by the wireless communication device of the present disclosure or its equivalent. This method includes one or both of a passive connection-establishment step for establishing peer-to-peer connection passively and an active connection-establishment step for establishing peer-to-peer connection actively. As it is shown in FIG. 4, an embodiment of the passive connection-establishment step includes the following subsidiary steps:

Step S410: broadcasting a local-end peer-to-peer connection packet. This step aims at no specific destination (e.g., the below-described first connection-end), or it could be said that this step is executed without referring to any request from some negotiation-ongoing device (i.e. some device negotiating with the device executing this step). In addition, this step can be executed by the transmission circuit 120 in FIG. 1 or the equivalent thereof.

Step S420: receiving a first connection-end peer-to-peer connection request from a first connection-end for the first time after the broadcasting of the local-end peer-to-peer connection packet, wherein the request is related to the local-end peer-to-peer connection packet, which means that the content of the request is affected by the content of the packet. This step could be carried out by the reception circuit 130 in FIG. 1 or its equivalent.

Step S430: setting the local-end wireless communication device (who carries out the present invention) to be a master or a slave in relation to the first connection-end according to the first connection-end peer-to-peer connection request. This step could be executed by the control block 110 in FIG. 1 or its equivalent.

Step S440: establishing peer-to-peer connection with the first connection-end. This step could be done by the wireless communication device 100 in FIG. 1 or the equivalent thereof.

Figure 5:
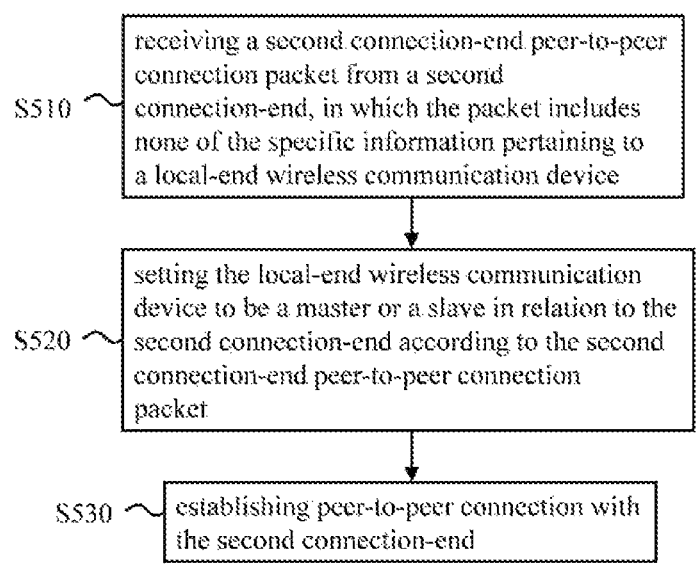
FIG. 5 illustrates an embodiment of the active connection-establishment step of the wireless communication method of the present disclosure.

On the other hand, as it is shown in FIG. 5, an embodiment of said active connection-establishment step includes the following subsidiary steps:

Step S510: receiving a second connection-end peer-to-peer connection packet from a second connection-end. This packet includes none of the information exclusively pertaining to the local-end wireless communication device (which carries out the present disclosure). In other words, the second connection-end peer-to-peer connection packet is not addressed to the local-end wireless communication device exclusively, which implies that this packet is a broadcasting packet or the like. This step could be carried out by the reception circuit 130 in FIG. 2 or the equivalent thereof.

Step S520: setting the wireless communication device to be a master or a slave in relation to the second connection-end according to the second connection-end peer-to-peer connection packet. This step could be executed by the control block 110 in FIG. 2 or its equivalent.

Step S530: establishing peer-to-peer connection with the second connection-end. This step could be carried out by the wireless communication device 100 in FIG. 2 or the equivalent thereof.

Since those of ordinary skill in the art can appreciate the implementation detail and modifications of the methods by referring to the fore-illustrated devices whose features can be reasonably adopted here, repeated and redundant description is therefore omitted provided that the remaining disclosure is still enough for understanding and enablement.

In summary, the wireless communication device and method of the present disclosure are able to establish peer-to-peer connection without using the social channels defined by Wi-Fi Direct Protocol and to straight determine the master-slave relationship between two negotiating ends by the one who acts as a connecting end. Therefore, this disclosure simplifies and accelerates the process of peer-to-peer connection, reduces the problems of unstable connection or time waste due to frequency jump, and prevents connection failure caused by an uncompromising master-slave negotiation.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A wireless communication device capable of passively establishing peer-to-peer connection under the regulation of an IEEE 802.11 standard, comprising:
    a control block operable to generate a local-end peer-to-peer connection message without referring to any information from a first connection-end, in which the local-end peer-to-peer connection message includes a local-end group owner intent;
    a transmission circuit operable to broadcast a local-end peer-to-peer connection packet according to the local-end peer-to-peer connection message; and
    a reception circuit operable to receive a first connection-end peer-to-peer connection request from the first connection-end for the first time after the broadcasting of the local-end peer-to-peer connection packet, in which the first connection-end peer-to-peer connection request includes a first connection-end group owner decision in relation to the local-end group owner intent;

wherein the wireless communication device is operable to function as a master or a slave in relation to the first connection-end according to the first connection-end group owner decision and to establish the peer-to-peer connection with the first connection-end.

2. The wireless communication device of claim 1, wherein the transmission circuit is operable to broadcast the local-end peer-to-peer connection packet through a wireless transmission channel, the reception circuit is operable to receive the first connection-end peer-to-peer connection request through the wireless transmission channel, and the wireless transmission channel is different from any of the social channels defined by Wi-Fi Direct Protocol.

3. The wireless communication device of claim 1, further capable of actively establishing peer-to-peer connection while the reception circuit is operable to receive a second connection-end peer-to-peer connection packet from a second connection-end, the control block is operable to set the wireless communication device to be the master or the slave in relation to the second connection-end according to a second connection-end group owner intent included in the second connection-end peer-to-peer connection packet and then generate a local-end peer-to-peer connection request message, and the transmission circuit is operable to send a local-end peer-to-peer connection request to the second connection-end according to the local-end peer-to-peer connection request message.

4. The wireless communication device of claim 3, wherein the control block is operable to decide whether it is appropriate for the wireless communication device to establish peer-to-peer connection with the second connection-end according to the transmission distance estimation, priority ranking or transmission rate of the second connection-end peer-to-peer connection packet.

5. The wireless communication device of claim 4, wherein the control block is operable to obtain the transmission distance estimation according to signal intensity, request time or signal quality of the second connection-end peer-to-peer connection packet.

6. The wireless communication device of claim 3, wherein the control block is operable to decide the wireless communication device to function as the master or the slave in relation to the second connection-end by comparing the second connection-end group owner intent with another local-end group owner intent.

7. The wireless communication device of claim 1, further capable of actively establishing peer-to-peer connection while the reception circuit is operable to receive a second connection-end peer-to-peer connection packet from a second connection-end and a third connection-end peer-to-peer connection packet from a third connection-end, and the control block is operable to allow the wireless communication device to establish peer-to-peer connection with the second or third connection-end in accordance with transmission distance estimations, priority rankings or transmission rates of the second and third connection-end peer-to-peer connection packets.

8. The wireless communication device of claim 7, wherein if the transmission distance estimation of the second connection-end peer-to-peer connection packet is better than the transmission distance estimation of the third connection-end peer-to-peer connection packet, if the priority ranking of the second connection-end peer-to-peer connection packet is higher than the priority ranking of the third connection-end peer-to-peer connection packet, or if the transmission rate indicated by the second connection-end peer-to-peer connection packet is higher than the transmission rate indicated by the third connection-end peer-to-peer connection packet, the control block is operable to allow the wireless communication device to establish peer-to-peer connection with the second connection-end.

9. The wireless communication device of claim 7, wherein if the control block allows the wireless communication device to establish peer-to-peer connection with the second connection-end, the control block is operable to set the wireless communication device to be the master or the slave in relation to the second connection-end according to a second connection-end group owner intent included in the second connection-end peer-to-peer connection packet and then generate a local-end peer-to-peer connection request message, and the transmission circuit is operable to send a local-end peer-to-peer connection request to the second connection-end according to the local-end peer-to-peer connection request message.

10. The wireless communication device of claim 7, wherein the control block is operable to obtain the transmission distance estimations of the second and third connection-end peer-to-peer connection packets according to signal intensities, request times or signal qualities of the second and third connection-end peer-to-peer connection packets.

11. A wireless communication device capable of actively establishing peer-to-peer connection under the regulation of an IEEE 802.11 standard, comprising:
a reception circuit operable to receive a second connection-end peer-to-peer connection packet from a second connection-end in which the second connection-end peer-to-peer connection packet includes no information exclusively pertaining to the wireless communication device,
a control block operable to set the wireless communication device to be a master or a slave in relation to the second connection-end according to a second connection-end group owner intent included in the second connection-end peer-to-peer connection packet, and thereby generate a local-end peer-to-peer connection request message; and
a transmission circuit operable to send a local-end peer-to-peer connection request to the second connection-end according to the local-end peer-to-peer connection request message.

12. The wireless communication device of claim 11, wherein the reception circuit is operable to receive a third connection-end peer-to-peer connection packet from a third connection-end, and the control block is operable to allow the wireless communication device to establish peer-to-peer connection with the second connection-end according to the transmission distance estimations, priority rankings or transmission rates of the second and third connection-end peer-to-peer connection packets.

13. The wireless communication device of claim 12, wherein the transmission distance estimation of the second connection-end peer-to-peer connection packet is better than the transmission distance estimation of the third connection-end peer-to-peer connection packet, the priority ranking of the second connection-end peer-to-peer connection packet is higher than the priority ranking of the third connection-end peer-to-peer connection packet, or the transmission rate indicated by the second connection-end peer-to-peer connection packet is higher than the transmission rate indicated by the third connection-end peer-to-peer connection packet.

14. The wireless communication device of claim 12, wherein the control block is operable to obtain the transmission distance estimation of the second and third peer-topeer connection packets according to the signal intensities, request times or signal qualities of the second and third peer-to-peer connection packets.

15. The wireless communication device of claim 12, wherein the reception circuit receives the second connection-end peer-to-peer connection packet through a wireless transmission channel of a second frequency and receives the third connection-end peer-to-peer connection packet through another wireless transmission channel of a third frequency.

16. A wireless communication method capable of establishing peer-to-peer connection, carried out by a wireless communication device conforming to an IEEE 802.11 standard, comprising:
    a passive connection-establishment step for establishing peer-to-peer connection passively, including the following subsidiary steps:
        broadcasting a local-end peer-to-peer connection packet which is generated without referring to any information of a first connection-end;
        receiving a first connection-end peer-to-peer connection request from the first connection-end, in which the first connection-end peer-to-peer connection request is related to the local-end peer-to-peer connection packet;
        setting the wireless communication device to be a master or a slave in relation to the first connection-end according to the first connection-end peer-to-peer connection request; and
        establishing peer-to-peer connection with the first connection-end; and/or
    an active connection-establishment step for establishing peer-to-peer connection actively, including the following subsidiary steps:
        receiving a second connection-end peer-to-peer connection packet from a second connection-end, in which the second connection-end peer-to-peer connection packet includes no information exclusively pertaining to the wireless communication device;
        setting the wireless communication device to be the master or the slave in relation to the second connection-end according to the second connection-end peer-to-peer connection packet; and
        establishing peer-to-peer connection with the second connection-end.

17. The wireless communication method of claim 16, wherein both the step of broadcasting the local-end peer-to-peer connection packet and the step of receiving the first connection-end peer-to-peer connection request are carried out through the same wireless transmission channel which is different from any of social channels defined by Wi-Fi Direct Protocol.

18. The wireless communication method of claim 16, wherein the active connection-establishment step further includes: receiving a third connection-end peer-to-peer connection packet from a third connection-end; and allowing the wireless communication device to establish peer-to-peer connection with the second connection-end according to the transmission distance estimations, priority rankings or transmission rates of the second and third connection-end peer-to-peer connection packets.

19. The wireless communication method of claim 18, wherein the active connection-establishment step further includes: obtaining the transmission distance estimations according to the signal intensities, request times or signal qualities of the second and third connection-end peer-to-peer connection packets, in which the transmission distance estimation of the second connection-end peer-to-peer connection packet is better than the transmission distance estimation of the third connection-end peer-to-peer connection packet.

20. The wireless communication method of claim 18, wherein the active connection-establishment step receives the second connection-end peer-to-peer connection packet through a wireless transmission channel of a second frequency, and receives the third connection-end peer-to-peer connection packet through another wireless transmission channel of a third frequency.

* * * * *